(12) United States Patent
Wehner et al.

(10) Patent No.: US 8,430,422 B2
(45) Date of Patent: Apr. 30, 2013

(54) AIRBAG WITH EXTERNAL TRACTION ELEMENT AND PROCESS FOR PRODUCTION THEREOF

(75) Inventors: Katharina Wehner, Herbertshausen (DE); Nico Wallat, Dachau (DE); Thomas Reiter, Vierkirchen (DE)

(73) Assignee: Autoliv Development AB, Vargarda (SE)

( * ) Notice: Subject to any disclaimer, the term of this patent is extended or adjusted under 35 U.S.C. 154(b) by 91 days.

(21) Appl. No.: 13/101,329

(22) Filed: May 5, 2011

(65) Prior Publication Data

US 2012/0007348 A1 Jan. 12, 2012

(30) Foreign Application Priority Data

Jul. 12, 2010 (DE) .......................... 10 2010 026 932

(51) Int. Cl.
*B60R 21/206* (2011.01)
*B60R 21/2338* (2011.01)

(52) U.S. Cl.
USPC ................ 280/730.1; 280/732; 280/743.1; 280/743.2

(58) Field of Classification Search ............... 280/730.1, 280/732, 743.1, 743.2
See application file for complete search history.

(56) References Cited

U.S. PATENT DOCUMENTS

| | | | | |
|---|---|---|---|---|
| 5,454,595 A * | 10/1995 | Olson et al. | ............... | 280/743.1 |
| 5,636,862 A * | 6/1997 | Cheung et al. | ............. | 280/730.2 |
| 5,730,464 A * | 3/1998 | Hill | ............... | 280/743.2 |
| 5,806,881 A * | 9/1998 | Richter et al. | ............. | 280/730.2 |
| 6,164,696 A * | 12/2000 | Ellerbrok et al. | ........... | 280/743.2 |
| 6,659,499 B2 * | 12/2003 | Jenkins | .......................... | 280/735 |
| 6,913,283 B2 * | 7/2005 | Heym | .......................... | 280/732 |
| 6,916,039 B2 * | 7/2005 | Abe | .............................. | 280/729 |
| 7,152,880 B1 * | 12/2006 | Pang et al. | ................. | 280/743.2 |
| 7,182,365 B2 * | 2/2007 | Takimoto et al. | ........... | 280/730.1 |
| 7,360,790 B2 * | 4/2008 | Hasebe et al. | ............. | 280/743.2 |
| 7,631,894 B2 * | 12/2009 | Hasebe et al. | ............. | 280/743.2 |
| 7,766,374 B2 * | 8/2010 | Abele et al. | ................ | 280/730.1 |
| 7,828,322 B2 * | 11/2010 | Breuninger et al. | ....... | 280/730.2 |
| 8,042,831 B2 * | 10/2011 | Hoffman et al. | ............ | 280/730.1 |
| 2005/0151351 A1 * | 7/2005 | Enders et al. | .............. | 280/730.1 |
| 2005/0206138 A1 | 9/2005 | Breuninger et al. | | |
| 2010/0117343 A1 | 5/2010 | Hoffman et al. | | |

FOREIGN PATENT DOCUMENTS

DE 102006051218 A1 11/2007

* cited by examiner

*Primary Examiner* — Paul N Dickson
*Assistant Examiner* — Laura Freedman
(74) *Attorney, Agent, or Firm* — Brinks Hofer Gilson & Lione

(57) ABSTRACT

An airbag has an airbag envelope (10) having two side walls (12, 14) enclosing a gas chamber. The first side wall (12) constitutes herein the impact surface and the second side wall (14) constitutes the support surface. A traction element (20) furthermore extends from a first end to a second end, whose first end is connected to the outer side of the second side wall (14) in order to force the inflated airbag to assume a curved shape. In order to achieve an easy production and assembly, the second end of the traction element (20) is also connected to the outer side of the second side wall (14), wherein the operating length of the traction element (20) is smaller than the length of the section of the second side wall (14) that is spanned thereby.

12 Claims, 6 Drawing Sheets

AIRBAG WITH EXTERNAL TRACTION ELEMENT AND PROCESS FOR PRODUCTION THEREOF

TECHNICAL FIELD OF THE INVENTION

The invention relates to an airbag, in particular a knee airbag, and to a process for production thereof.

BACKGROUND OF THE INVENTION

Knee airbags are being increasingly used in the automobile industry. They serve essentially for two purposes, namely, to protect the knee-tibia region against impact with a generally hard instrument panel, on the one hand, as well as to prevent the forward displacement of the pelvis of the passenger to be protected in case of an accident, in particular when the latter is not buckled in.

It is advantageous in many applications to connect the knee airbag to the vehicle by means of its posterior end, so that the connection point is located at a lower point of the instrument panel or even in a transition area between the instrument panel and the foot well cover panel (so-called "low mount concept"). If the knee airbag is mounted in this way, provisions must be made to ensure that the expanding airbag follows essentially the convex shape of the instrument panel, so that it has a kind of "banana shaped" cross section. Several proposals have already been made by which this can be accomplished.

DE 10 2007 005 304 A1, for example, describes a knee airbag in which the side wall of the airbag envelope that faces toward the instrument panel, which also constitutes the support surface, is shortened in the longitudinal direction of the knee airbag with respect to the other side wall that faces the knee-tibia region of the passenger, which also constitutes the impact surface. The desired curved or bent cross section is obtained in this way once the knee airbag has been completely filled. Relatively precise sewing processes, which are difficult to automate, must be carried out in order to create the seams required for the shortening effect even if the design of this knee airbag is quite simple.

The class-defining DE 10 2006 051 218 A1 shows a knee airbag with a traction element in the shape of a strap sewn on the side wall thereof, which constitutes the support surface. The second end of this strap is connected to a part that is fixed on the vehicle, so that a force transmission between this part that is fixed on the vehicle and the corresponding side wall pulls the knee airbag into the desired shape. The disadvantage of this is that the assembly in the motor vehicle is relatively complicated, since it is necessary to connect the knee airbag to another vehicle part. A component that is fixed on the vehicle and can correspondingly absorb large forces must also be provided.

SUMMARY OF THE INVENTION

Consequently, the invention has as an object to make available an airbag, in particular a knee airbag, which assumes a curved or bent shape in expanded state, and which is easy to produce and assemble.

This object is attained by means of an airbag having the following features. The airbag has an airbag envelope which encloses the gas chamber. The first side wall constitutes herein the impact surface and the second side wall constitutes the support surface. A traction element, which extends from a first end to the second end, is attached, for example sewn, with this first end on the outer side of the second side wall. The second end of this traction element is also connected to the outer side of the side wall according to the invention, wherein the operating length of the traction element is smaller than the length of the section of the second side wall that is spanned by it. An effective shortening of the second side wall takes place to a certain extent through this traction element, whereby the completely expanded airbag is forced into the desired curved or bent shape.

As already mentioned, the invention is preferably applicable on a knee airbag.

In addition, the traction element is preferably arranged on the second side wall in a posterior area that faces toward the inflator (gas generator). This area generally contributes little or nothing to the protection of the passenger with a knee airbag of the kind discussed herein, but serves rather for filling in the area that constitutes the actual protective area.

In addition, this area can therefore be configured as a constricted fill channel, whereby the gas volume of the airbag to be filled is reduced. Either a smaller gas generator can be used and/or the filling time can be reduced in this way. As will be shown below with reference to the preferred exemplary embodiments, an airbag such as this is very easy to produce.

BRIEF DESCRIPTION OF THE DRAWINGS

The invention will now be described in more detail with reference to the figures with the aid of exemplary embodiments, wherein.

DETAILED DESCRIPTION OF THE DRAWINGS

Figure 1:
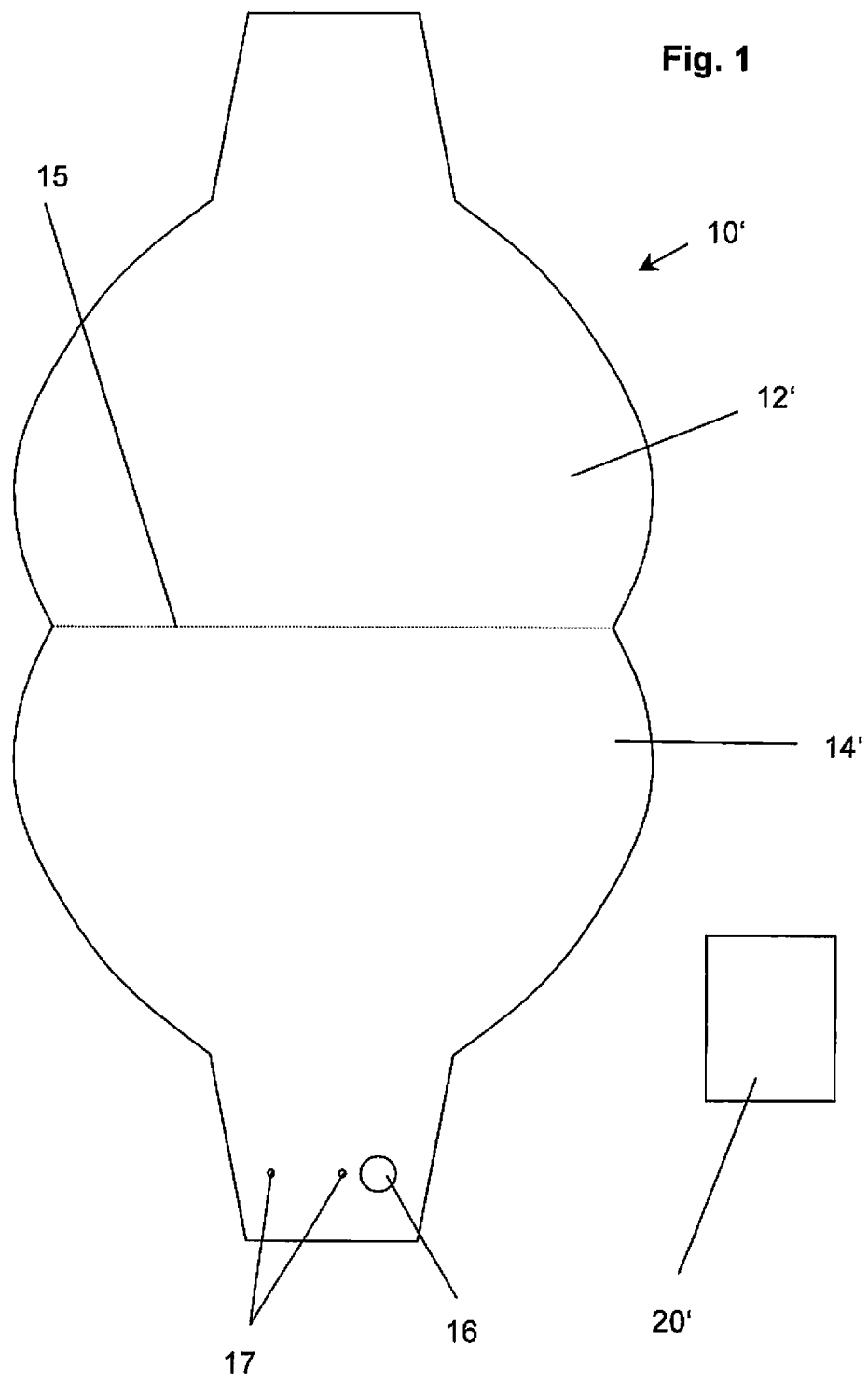
FIG. 1 shows the precut parts for producing a airbag according to a first exemplary embodiment of the invention.

FIG. 1 shows two precut parts for a knee airbag. These two precut parts are the precut part 10' for the airbag envelope and the precut part 20' for a strap, which forms a traction element. In the shown exemplary embodiment, the airbag envelope is made from a single precut part, which is folded along a folding line 15. It would naturally likewise be possible to produce the airbag envelope 10 from two precut parts. The precut part 10' for the airbag envelope is essentially symmetrical with two precut parts 12', 14', wherein a hole 16 for inserting a gas generator and holes 17 for the gas generator bolts are provided in an end area of the second section 14'. The precut part 20' for the traction element is essentially rectangular in the shown exemplary embodiment.

Figure 2:
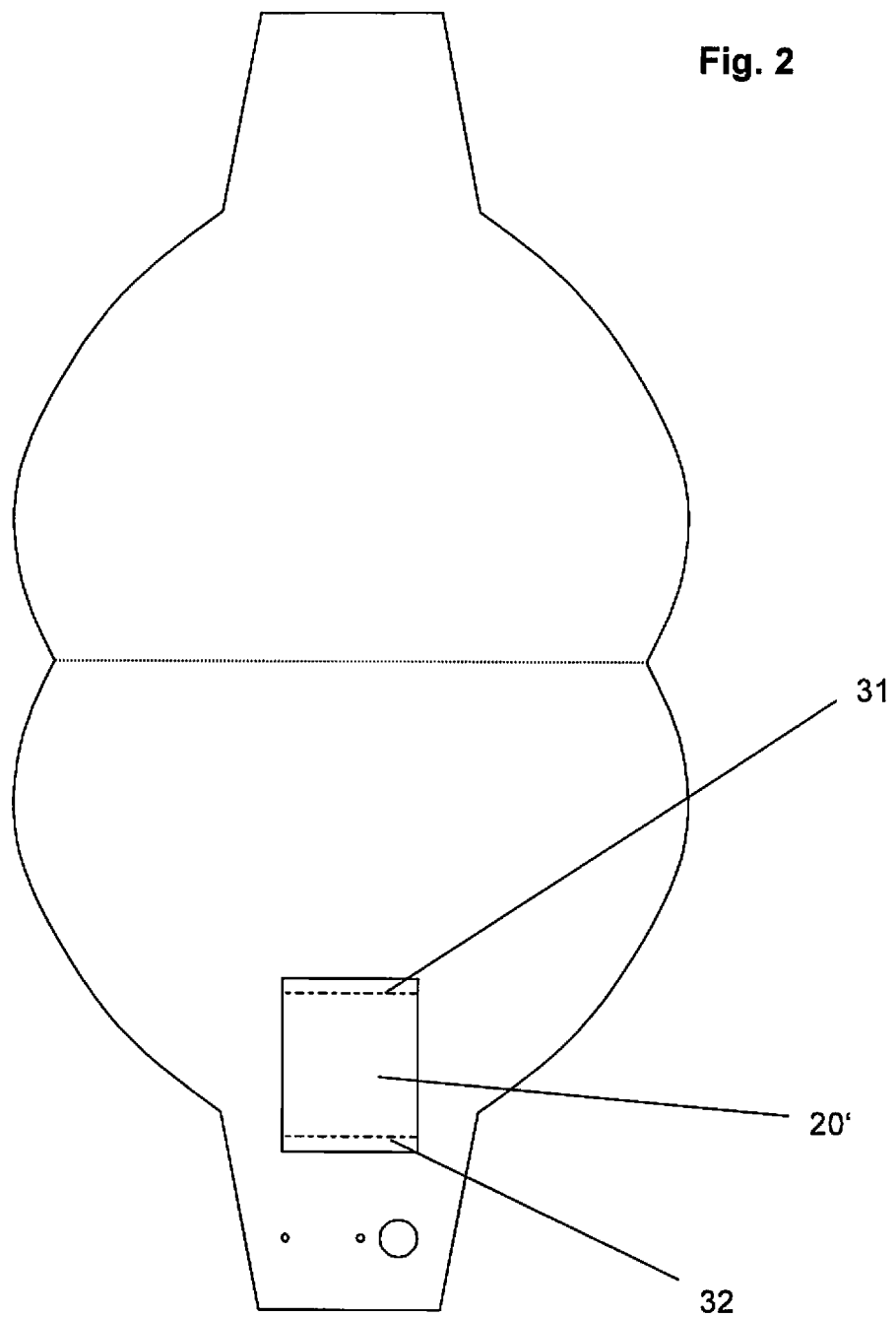
FIG. 2 shows the airbag of FIG. 1 after a first sewing process has been completed.

As can be seen in FIG. 2, the precut part 20' for the traction element is first sewn by means of two attachment seams 31, 32 on a second section 14' of the airbag envelope 10. Other possibilities for attachment, such as welding or gluing, are likewise possible independently from the material selected for the precut parts.

After the precut part 20' for the traction element 20 has been positioned, the precut part 10' for the airbag envelope is folded along the folding line 15 so that the two sections 12', 14' of the precut part 10' rest one on top of the other, while the precut part 20' for the traction element is located on the outside. The border seam is then created, so that the airbag envelope 10 having the two side walls 12, 14 is closed. The two section side walls 12, 14 rest congruently one on top of the other in this state (refer to FIGS. 3 and 4).

Figure 5:
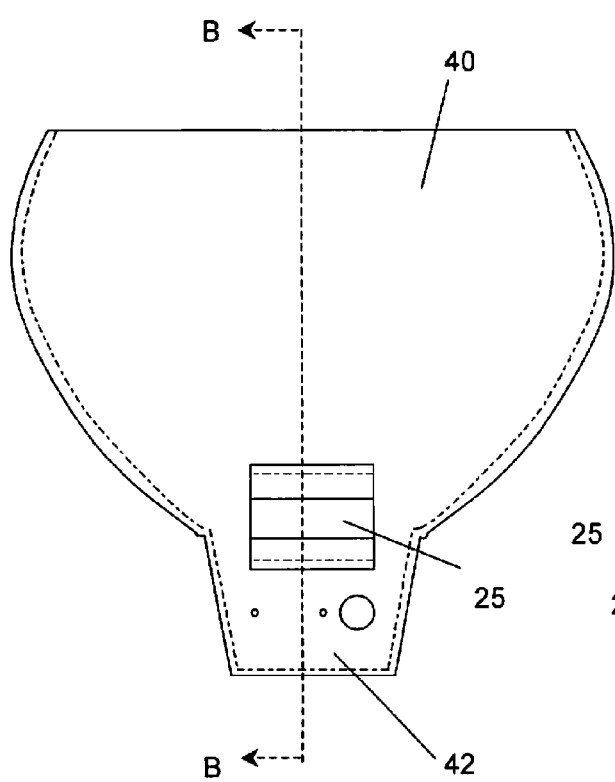
FIG. 5 shows the airbag of FIG. 3 after a third sewing process has been completed.
Figure 6:
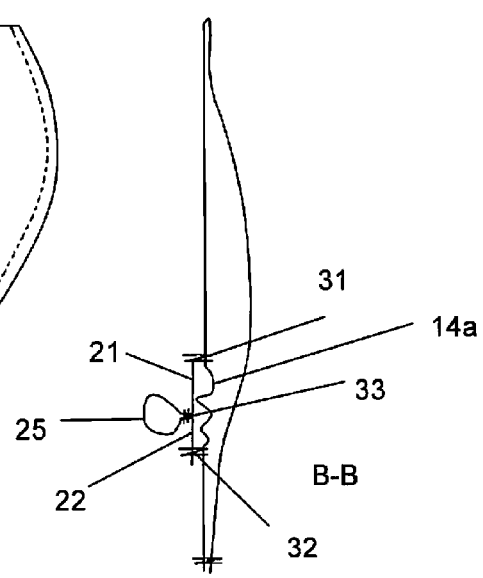
FIG. 6 shows the airbag of FIG. 5 along the section line B-B.

The precut part 20' for the traction element is tightened in the next work step, as shown in FIGS. 5 and 6, so that a kind of loop 25 is formed, as can be seen in particular in FIG. 6. This loop 25 is fixed with a shortening seam 33, so that the precut part 20' has now three sections, namely the first section 21 extending from the first attachment seam 31 to the shortening seam 33, the loop 25, which extends virtually from the shortening seam 33 to the shortening seam 33, and the second section 22 extending from the shortening seam 33 to the second attachment seam 32. The loop is now functionless and the first and second sections constitute the traction element 20, which extends from a first end, namely the first attachment seam 31, to a second end, namely the second attachment seam 32.

Figure 7:
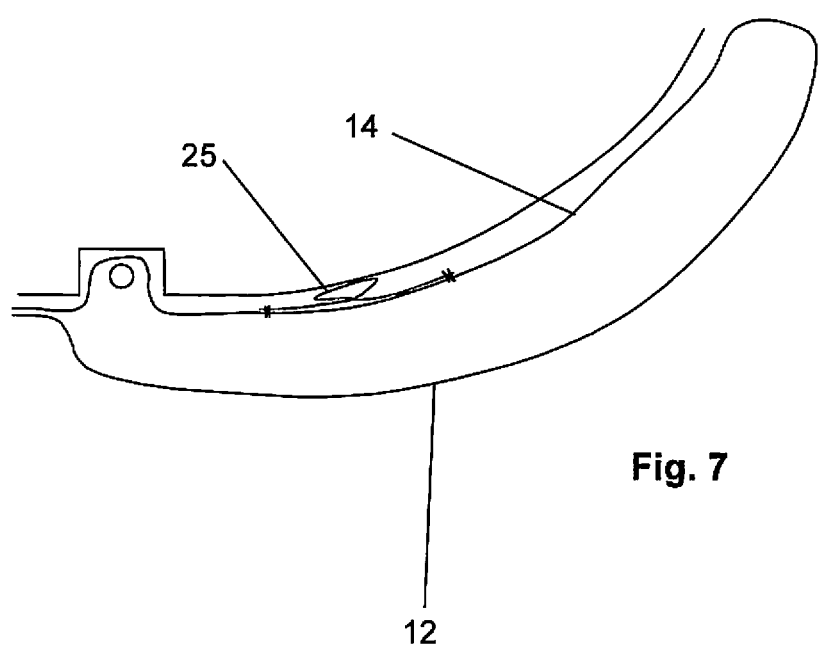
FIG. 7 shows the assembled and completely filled knee airbag of FIG. 6.

The entire second side wall 14 is shortened with respect to the first side wall 12 as a result of the traction element 20, which is shorter than the length of the section 14a of the second side wall 14 spanned by it, so that the desired curved or bent shape is obtained when the gas envelope 10 is fully expanded, as can be seen in FIG. 7. Rebound straps (not shown) operating between the two side walls can additionally be provided.

In FIG. 5 it can be seen that the airbag envelope 10 has two areas, namely the protective area 40 located in the anterior area and the gas generator area 42 located in the posterior area, which can be tapered with respect to the protective area 40.

After the production of the airbag envelope 10 is complete, the loop 25 is functionless, so that it could be basically eliminated, which generally does not occur due to the unnecessary further effort that this would require. It would further be possible as an alternative to utilize two precut parts instead of one precut part 20' for the traction element 20 and to mutually connect these by means of a shortening seam. The above-described is to be preferred, however, from the point of view of the production process. It should be emphasized that other types of connections, in particular welding or gluing, can be selected instead of a shortening seam 33.

Figure 3:
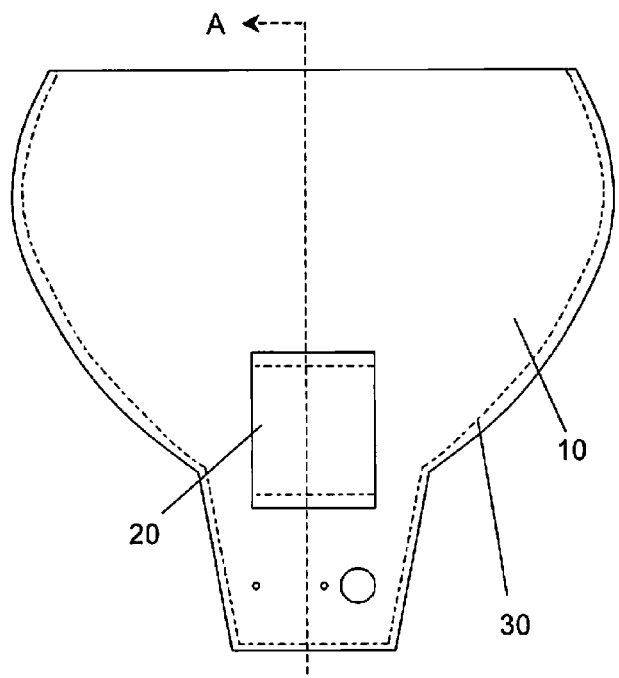
FIG. 3 shows the airbag of FIG. 2 after a second sewing process has been completed.
Figure 4:
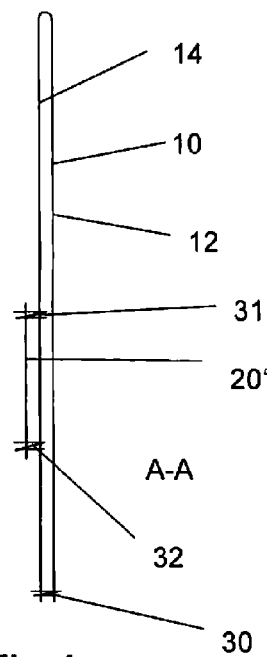
FIG. 4 shows the airbag of FIG. 3 along the section line A-A.
Figure 10:
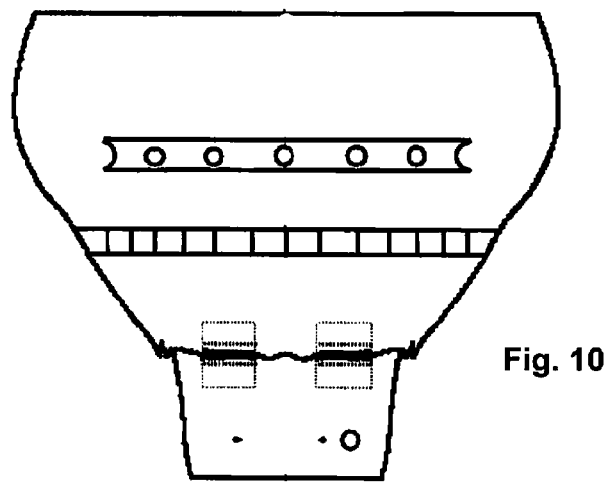
FIG. 10 shows the airbag of FIG. 9 in a state corresponding to FIG. 5.
Figure 9:
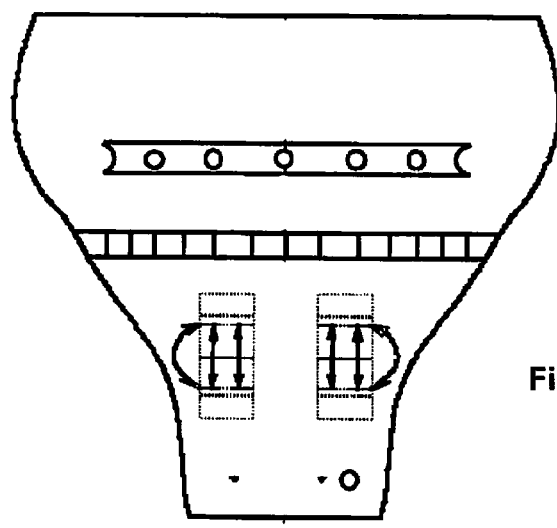
FIG. 9 shows the airbag of FIG. 8 during the tightening of the traction elements.
Figure 8:
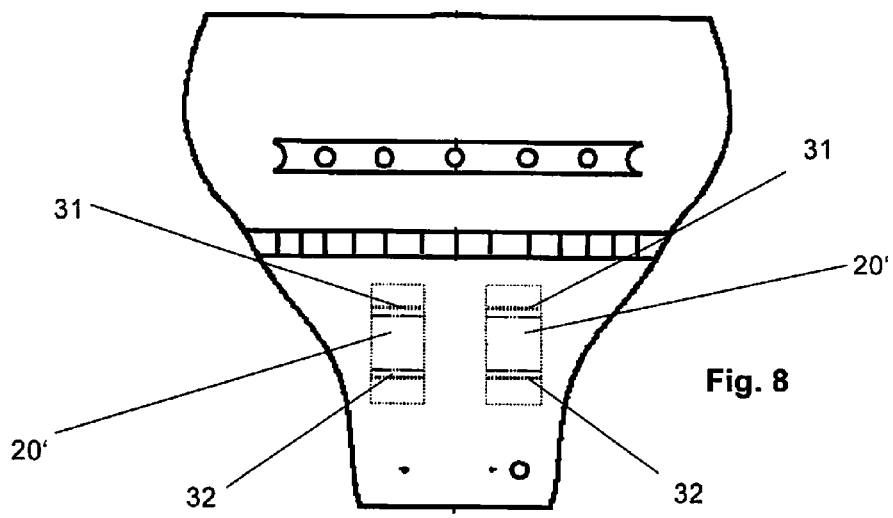
FIG. 8 shows a second exemplary embodiment of the invention in a state corresponding to FIG. 3.

FIGS. 8 to 10 show a second exemplary embodiment of the invention, wherein FIG. 8 corresponds to the state of FIG. 3 and FIG. 10 corresponds to the state of FIG. 5 and FIG. 9 shows the intermediate state. It can seen herein that two traction elements 20 can be utilized instead of one traction element 20, which can contribute to the stabilization of the overall shaping operation. The positions of the subsequent shortening seams are represented by the dash-colon-dash pattern in FIG. 8.

Figure 13:
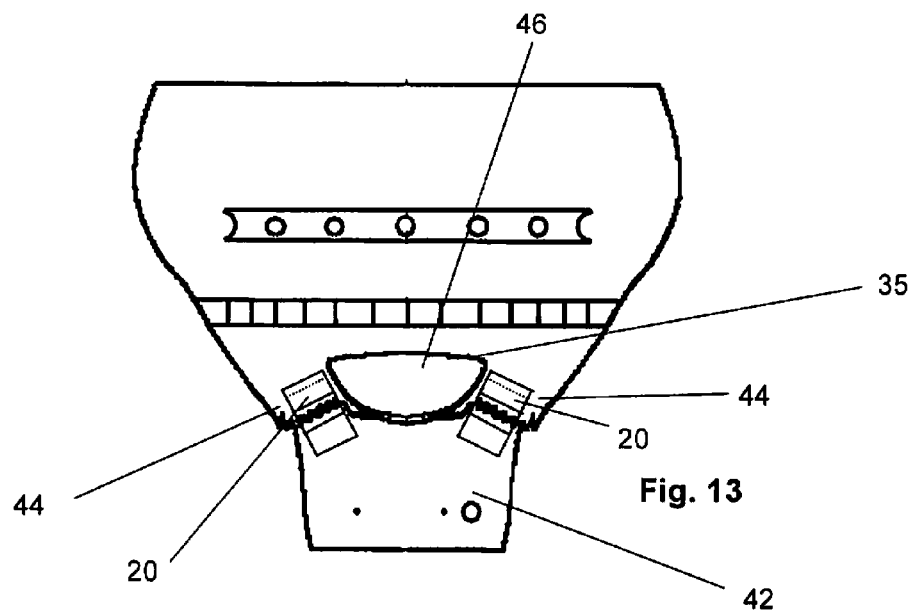
FIG. 13 shows the airbag of FIG. 10 in a state corresponding to FIG. 10.
Figure 12:
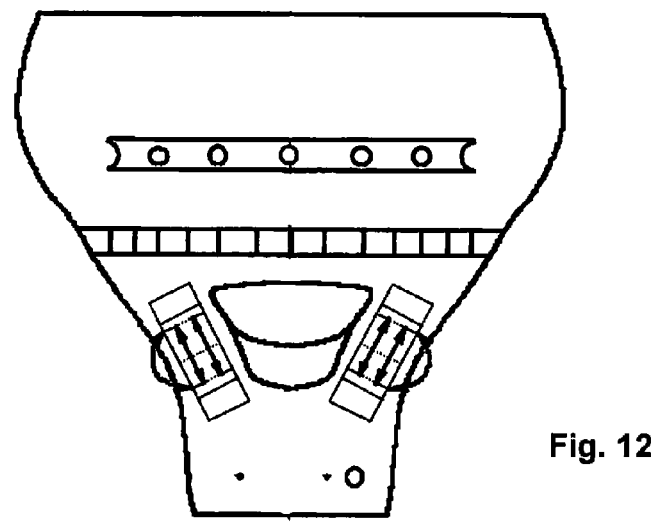
FIG. 12 shows the airbag of FIG. 11 in a state corresponding to FIG. 9.
Figure 11:
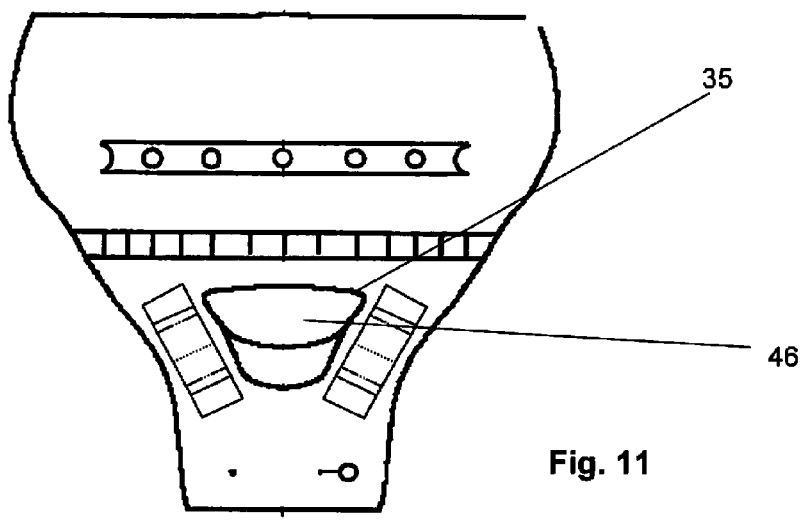
FIG. 11 shows a third exemplary embodiment of the invention in a representation corresponding to FIG. 8.

FIGS. 11 to 13 show a third exemplary embodiment corresponding to the representations of FIGS. 8 to 10. Two traction elements 20 (that is, also two precut parts 20' for the traction elements 20) are also provided herein. The transition area between the gas generator area 42 and the protective area 40 is further configured in the shape of two fill channels 44, which are mutually separated by means of a non-inflatable area 46. The two traction elements 20 precisely span the fill channels 44. One advantage of this configuration is a volume reduction of the overall airbag envelope 10. However, the connecting seam 35, which separates the non-inflatable area 46 from the fill channels 44, is arranged after the border seam 30 is closed, but before the precut part 20' for the traction elements 20 is shortened.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. An airbag with an airbag envelope enclosing a gas chamber, comprising a first side wall forming an impact surface and a second side wall forming a support surface, and a first traction element and a second traction element, the first traction element extending between a first end and a second end, the second traction element extending between a third end and a fourth end, the first end being connected to a first location on an outside surface of the second side wall and the second end being connected to a second location on the outside surface of the second side wall, the first and second locations spanning a first length of side wall material, the third end being connected to a third location on an outside surface of the second side wall and the fourth end being connected to a fourth location on the outside surface of the second side wall, the third and fourth locations of the second traction element spanning a second length of side wall material, the distance between the first and second ends of the first traction element being smaller than the first length, and the distance between the first and second ends of the second traction element being smaller than the second length, the first length of sidewall material extending along a first fill channel, and the second length of sidewall material extending along a second fill channel, the first and second fill channels being separated from each other, and the first, second, third, and fourth locations all being separate from seams connecting the first side wall to the second side wall.

2. The airbag according to claim 1, further comprising that the first and second traction elements are arranged on the second side wall in a posterior area facing toward an inflator.

3. The airbag according to claim 1, further comprising that the first traction element has a connecting area between the first end and the second end, in which the first traction element is connected to itself and that the second traction element has a connecting area between the third end and the fourth end, in which the second traction element is connected to itself.

4. The airbag according to claim 3, further comprising that a closed loop extends from each connecting area.

5. The airbag according to claim 1, further comprising that the first and second traction elements are straps.

6. The airbag according to claim 1, further comprising that the first side wall and the second side wall are congruent.

7. The airbag according to claim 6, further comprising that the first side wall and the second side wall are directly connected to each other in a peripheral area.

8. The airbag according to claim 1, further comprising that the first and second fill channels are constricted fill channels.

9. The airbag according to claim 1, wherein the first and second traction elements are arranged generally parallel to each other.

10. A method of manufacturing an airbag having a first side wall and a second side wall, the method comprising the steps of:
providing a first traction element and a second traction element, the first traction element having a first end and a second end and the second traction element having a third end and fourth end;
attaching the first and second ends of the first traction element to the second side wall in a first location and a second location, the first location and the second location spanning a first length of sidewall material;
attaching the third and fourth ends of the second-traction element to the second side wall in a third location and a fourth location, the third location and the fourth location spanning a second length of sidewall material;
shortening the first traction element between the first end and the second end by such an amount that the distance between the first and second ends of the first traction element is smaller than the first length of side wall material; and
shortening the second traction element between the third end and the fourth end by such an amount that the distance between the third and fourth ends of the second traction element is smaller than the second length of side wall material;
wherein the first length of sidewall material spanned by the first traction element extends along a first fill channel and the second length of sidewall material spanned by the second traction element extends along a second fill channel, the first and second fill channels being separated from each other when the airbag is fully assembled, and the first, second, third, and fourth locations all being separate from seams connecting the first side wall to the second side wall.

11. The method according to claim 10, wherein the first traction element is shortened by connecting two areas of the first traction element with each other in a connecting area between the first end and the second end of the first traction element and the second traction element is shortened by connecting two areas of the second traction element with each other in a connecting area between the third end and the fourth end of the second traction element.

12. A method of manufacturing an airbag having a first side wall and a second side wall, the method comprising the steps of:
providing at least one traction element having a first end and a second end;
attaching the first end to the second side wall in a first location and the second end in a second location, the first location and the second location spanning a length of sidewall material;
shortening the traction element between the first end and the second end by such an amount that the distance between the first and second ends of the traction element is smaller than the length of side wall material between the first location and the second location; and
connecting the first and second side walls to each other after attaching the at least one traction element to the second side wall.

* * * * *